US010086729B2

(12) United States Patent
Tat

(10) Patent No.: US 10,086,729 B2
(45) Date of Patent: Oct. 2, 2018

(54) HEADREST

(71) Applicant: Dorel Juvenile Group, Inc., Foxboro, MA (US)

(72) Inventor: Kim Tat, South Melbourne (AU)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/429,230

(22) Filed: Feb. 10, 2017

(65) Prior Publication Data

US 2017/0291516 A1    Oct. 12, 2017

Related U.S. Application Data

(60) Provisional application No. 62/320,695, filed on Apr. 11, 2016.

(51) Int. Cl.
*A47C 7/38* (2006.01)
*B60N 2/885* (2018.01)
*B60N 2/806* (2018.01)

(52) U.S. Cl.
CPC ............ *B60N 2/885* (2018.02); *B60N 2/806* (2018.02)

(58) Field of Classification Search
CPC .... B60N 2/885; B60N 2/2872; B60N 2/2851; B60N 2/882; B60N 2/2812; B60N 2/2839; A47C 7/383; A47C 7/38
See application file for complete search history.

(56) References Cited

U.S. PATENT DOCUMENTS

| | | | |
|---|---|---|---|
| 5,275,462 | A | 1/1994 | Pond et al. |
| 5,645,317 | A | 7/1997 | Onishi et al. |
| 6,116,691 | A | 9/2000 | Reece |
| 6,123,389 | A | 9/2000 | O'Connor et al. |
| 6,139,100 | A | 10/2000 | Baskin-Lockman et al. |
| 6,250,716 | B1 | 6/2001 | Clough |
| 6,378,950 | B1 | 4/2002 | Takamizu et al. |
| 6,467,846 | B2 | 10/2002 | Clough |
| 6,623,074 | B2 | 9/2003 | Asbach et al. |
| 6,666,517 | B2 | 12/2003 | Clough |
| 6,986,548 | B2 | 1/2006 | Jane Santamaria |
| 7,040,705 | B2 | 5/2006 | Clough |
| 7,232,185 | B2 | 6/2007 | Hartenstine et al. |
| 7,264,313 | B2 | 9/2007 | Clough |
| 7,364,239 | B2 | 4/2008 | Clough |
| 9,079,520 | B1 | 7/2015 | Hungerford |

FOREIGN PATENT DOCUMENTS

| | | |
|---|---|---|
| FR | 2962081 | 1/2012 |
| WO | 2009009091 A1 | 1/2009 |

OTHER PUBLICATIONS

Australian Patent Office International-Type Search Report, Australian Application No. 2015904418, dated Aug. 12, 2016, 8 pages.

*Primary Examiner* — Shin H Kim
(74) *Attorney, Agent, or Firm* — Barnes & Thornburg LLP

(57) ABSTRACT

A headrest for a vehicle child restraint is adapted to be mounted to a seat back and configured to support the head of a child seated in the vehicle child restraint. The headrest includes first and second side wings arranged to lie in laterally spaced-apart relation to one another.

19 Claims, 7 Drawing Sheets

HEADREST

PRIORITY CLAIM

This application claims priority under 35 U.S.C. § 119(e) to U.S. Provisional Application No. 62/320,695, filed Apr. 11, 2016, which is expressly incorporated by reference herein.

BACKGROUND

The present disclosure relates to headrests and particularly to a headrest for use in a vehicle seat. More particularly, the present disclosure relates to a headrest in a child restraint such as a juvenile vehicle seat.

SUMMARY

A headrest in accordance with the present disclosure includes a back plate and a pair of side wings. A first side wing is arranged to lie in spaced-apart relation to a second side wing to locate the back plate the first and second side wings.

In illustrative embodiments, the headrest further includes support means coupled to the first and second side wings for supporting the chin or jaw of an occupant having a head accommodated between the side wings. The support means is mounted for movement relative to the side wings from a RETRACTED position to an EXTENDED AND INCLINED position using a controller associated with the support means.

In illustrative embodiments, the support means includes movable first and second chin-support pads. Each pad can be moved to extend inwardly to allow a child seated in a child restraint including the headrest to rest their chin on one of the pads so that they have support for their head while they are sleeping. The first chin-support pad is mounted on the first side wing for pivotable movement about a positively sloping inclined first pad pivot axis toward the second side wing from a RETRACTED position alongside the first side wing to an EXTENDED AND INCLINED position away from the first side wing. The second chin-support pad is mounted on the second side wing for pivotable movement about a positively sloping inclined second pad pivot axis toward the first side wing from a RETRACTED position alongside the second side wing to an EXTENDED AND INCLINED position away from the second side wing.

In illustrative embodiments, the controller includes a pad mover that is provided for each chin-support pad. A first pad mover is coupled to the first side wing and configured to move the first chin-support pad about the first pad pivot axis and maintain the first chin-support pad in a selected EXTENDED AND INCLINED position until the head of an occupant seated in a seat associated with the headrest is moved to apply a pad-retraction force in excess of a predetermined force to cause the first chin-support pad to pivot toward its RETRACTED position. A second pad mover is coupled to the second side wing and configured to move the second chin-support pad about the second pad pivot axis and maintain the second chin-support pad in a selected EXTENDED AND INCLINED position until the head of an occupant seated in a seat associated with the headrest is moved to apply a pad-retraction force in excess of a predetermined force to cause the second chin-support pad to pivot toward its RETRACTED position. Each pad mover includes a lever that is mounted on an outer wall of the companion side wing and arranged to be gripped and pulled (or pushed) by a caregiver to cause pivoting movement of the chin-support pad relative to the companion side wing.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

A headrest 10 in accordance with the present disclosure is configured to provide an extendible chin and/or jaw support at each side of the child's face to at least in part alleviate the problem of head movement of a sleeping child in a vehicle child restraint of a kind in which the child is seated upright. This adaptation stems from an observation that when a child falls asleep in a child restraint seat, the child's head generally falls forward and tips somewhat to either left or right. Headrest 10 is suited for use with all people and in a wide variety of seat applications other than juvenile vehicle seats.

Figure 1:
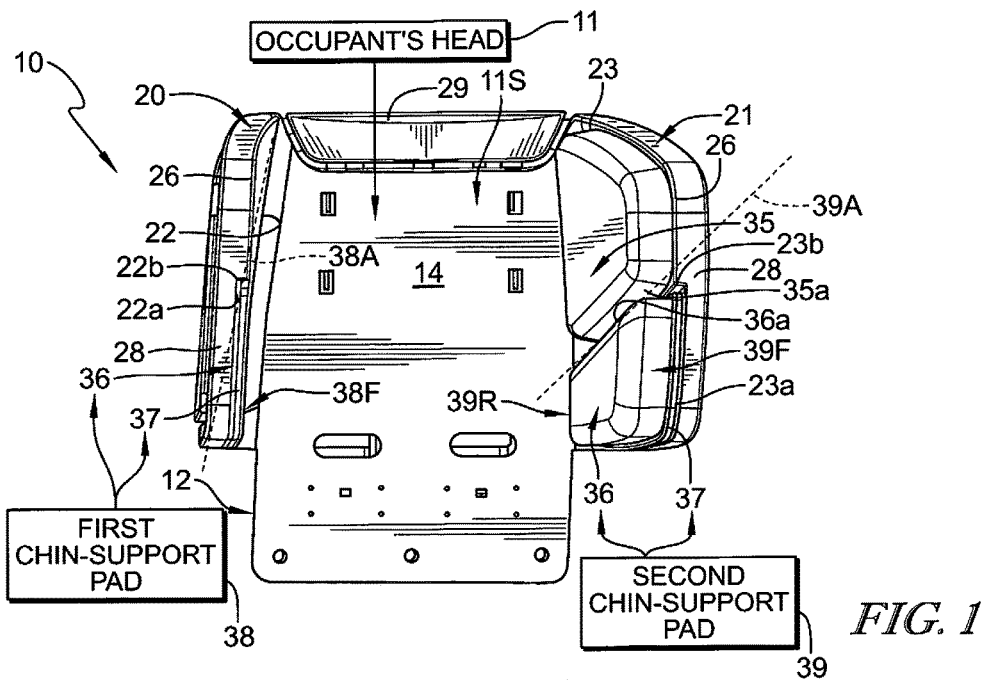
FIG. 1 is a front view of a headrest according to an illustrative embodiment of the present disclosure, shown with each chin-support pad fully RETRACTED.
Figure 2:
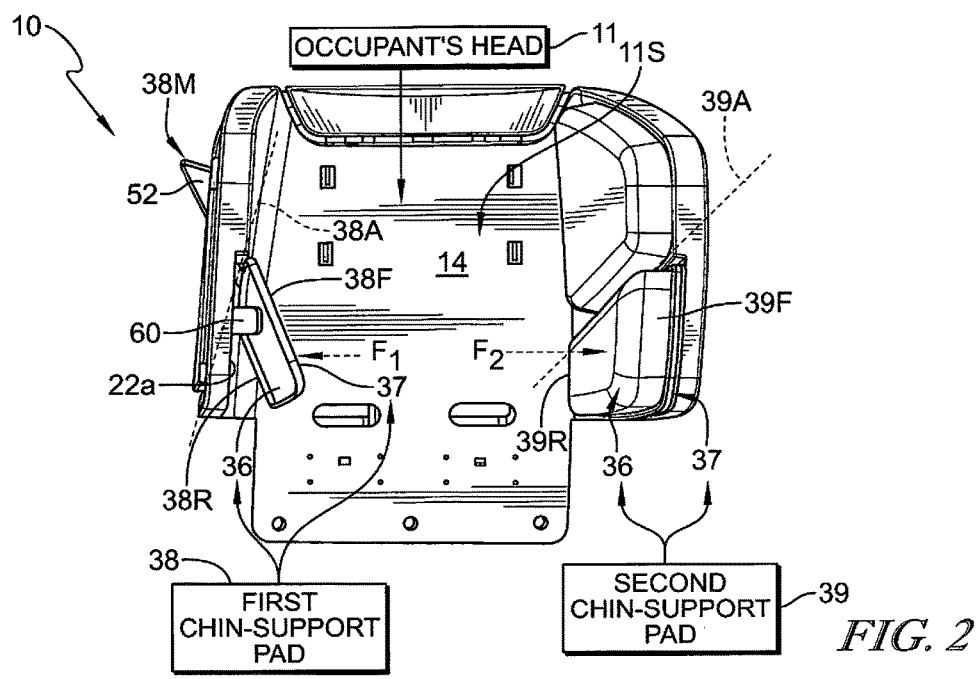
FIG. 2 is a view similar to FIG. 1 but showing the first chin-support pad on a first side wing of the headrest after it has been moved inwardly to an EXTENDED AND INCLINED position and showing the second chin-support pad on an opposite second side wing of the headrest in a RETRACTED position.
Figure 3:
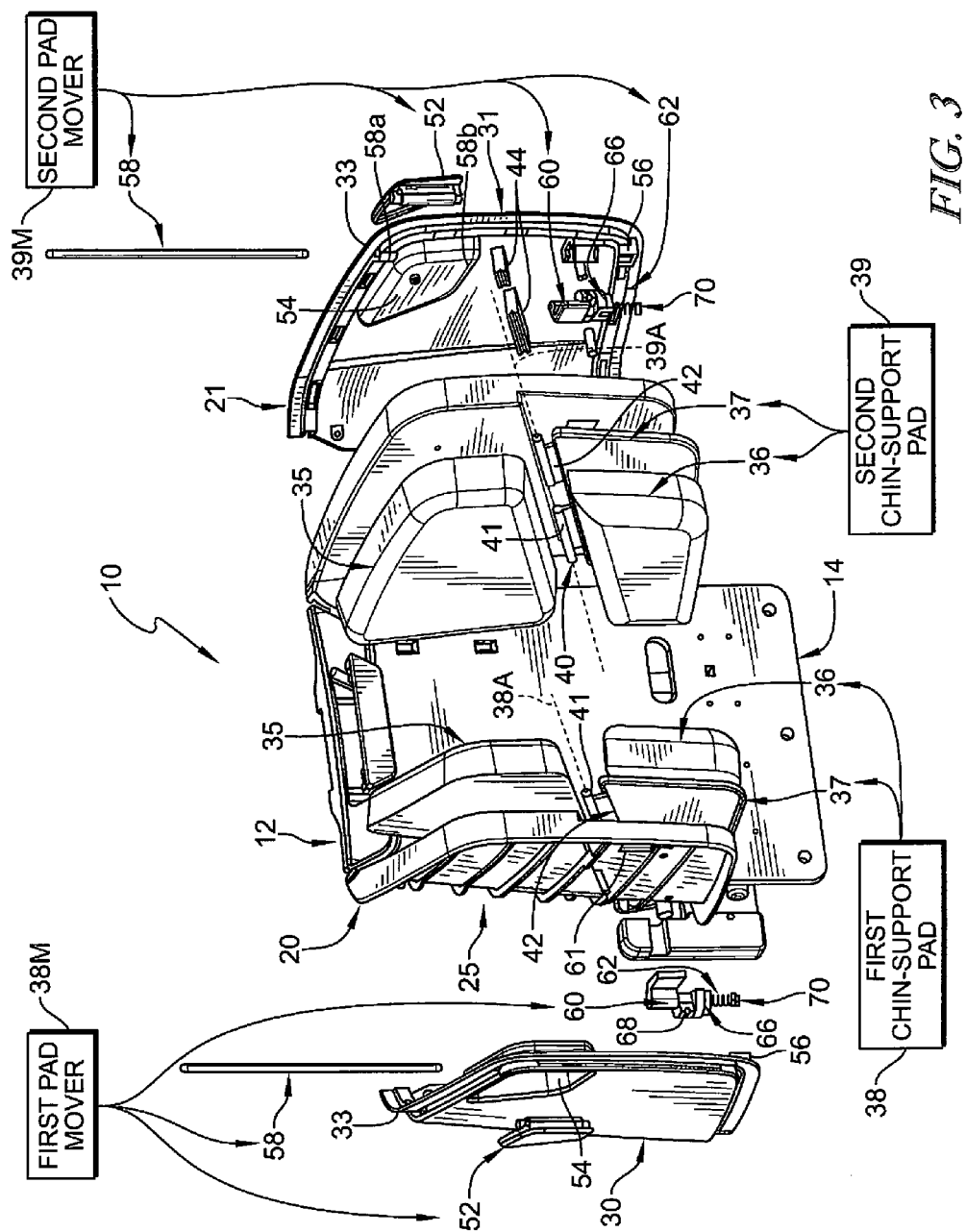
FIG. 3 is an exploded front perspective view of the headrest showing (on the left) components that cooperate to form a first pad mover associated with the first chin-support pad and adapted to be mounted on the first side wing of the headrest and showing (on the right) components that cooperate to form a second pad mover associated with the second chin-support pad and adapted to be mounted on a second side wing of the headrest.

A headrest 10 in accordance with the present disclosure includes a back plate 14 and a pair of side wings 20, 21 that project outwardly from the back plate 14 as suggested in FIGS. 1-3. The side wings 20, 21 are spaced apart to accommodate a person's head between generally opposed inside faces 22, 23 of the side wings 20, 21.

In illustrative embodiments, headrest 10 further includes opposed first and second chin-support pads 38, 39 mounted to the respective side wings 20, 21 for pivotable movement about respective non-horizontal pivot axes 38A, 39A between a RETRACTED position adjacent the companion side wing and an EXTENDED AND INCLINED position in which they are oriented to provide a chin and/or jaw support for a person's head when accommodated between the side wings 20, 21. Each pivot axis 38A, 39A is inclined rearwardly and downwardly at about a 20° to 30° angle relative to the horizontal in illustrative embodiments.

In an illustrative embodiment, first chin-support pad 38 can be moved by a caregiver about a positively sloping non-horizontal first pad pivot axis 38A (see FIG. 3) from a RETRACTED position aligned with companion first side wing 20 as shown in FIG. 1 to an EXTENDED AND INCLINED position arranged to lie at a compound angle to companion first side wing 20 as shown in FIG. 2. Similarly, second chin-support pad 39 can be moved by a caregiver about a positively sloping non-horizontal second pad pivot axis 39A that is arranged to lie in spaced-apart non-parallel relation to the positively sloping non-horizontal first pad pivot axis 38A as suggested in FIGS. 3 and 4. Second chin-support pad 39 can be moved about second pad pivot axis 39A from a RETRACTED position aligned with companion second side wing 21 shown in FIGS. 1 and 2 to an EXTENDED AND INCLINED position (not shown).

In illustrative embodiments, headrest 10 further includes first and second pad movers 38M, 39M as suggested in FIGS. 1-3. Each pad mover 38M, 39M includes a hand operable actuator 52 that is separate from the companion chin-support pad 38 or 39. Illustratively, separate first and second pad movers 38M, 39M are operable separately and individually to move the respective chin-support pads 38, 39 at least from their RETRACTED position to the EXTENDED AND INCLINED position. It is within the scope of the present disclosure to include in headrest 10, a control mechanism 11 that is configured to provide controller means suggested in FIG. 3 for operating the first and second, pad movers 38M, 39M simultaneously to cause the first and second pads 38, 39 to move in unison either to the EXTENDED AND INCLINED positions or to the RETRACTED positions.

Each chin-support pad 38 or 39 is mounted for pivotable movement between its RETRACTED position and its EXTENDED AND INCLINED position about an axis 38A or 39A that is adjacent an upper edge or face of the chin-support pad and that is rearwardly and downwardly inclined when headrest 10 is in its normal operative position. A chin-support pad 38 or 39 thus mounted may typically be of greater height at its front 38F or 39F than at its rear 38R or 39R as suggested in FIGS. 2 and 3. This arrangement in accordance with the present disclosure has been found effective in both supporting the person's head and maintaining it in a generally upright position.

Each chin-support pad 38, 39 illustratively includes a cushion 36 and a cushion base 37 in an illustrative embodiment as suggested in FIGS. 1 to 3. Each cushion 36 defines a face that contacts the chin and/or jaw in the EXTENDED AND INCLINED position. Each chin-support pad 38, 39 also includes a cushion base 37 on which a companion cushion 36 is mounted. It is within the scope of the present disclosure to use a plate made of a plastics material to form each of the chin-support pads 38, 39.

The chin-support pads 38, 39 may be configured to define a plurality of EXTENDED AND INCLINED positions, for example, at different discrete angular intermediate positions about respective pivot axes 38A, 39A relative to the RETRACTED position and between the RETRACTED position and the EXTENDED AND INCLINED position. These plural EXTENDED AND INCLINED positions may be defined by respective INDEX positions on an indexing mechanism 62 in accordance with the present disclosure.

Each INDEX position on the indexing mechanism 62 may be such that a sufficient predetermined force applied to or against the chin-support pad 38 or 39 will cause movement of the chin-support pad 38 or 39 back towards its RETRACTED position. In this way, provision is made in accordance with the present disclosure for overriding the indexing mechanism 62 to ensure that each chin-support pad 38, 39 returns to its optimally protective RETRACTED position in the event of an external impact applied directly or indirectly to headrest 10.

Figure 9:
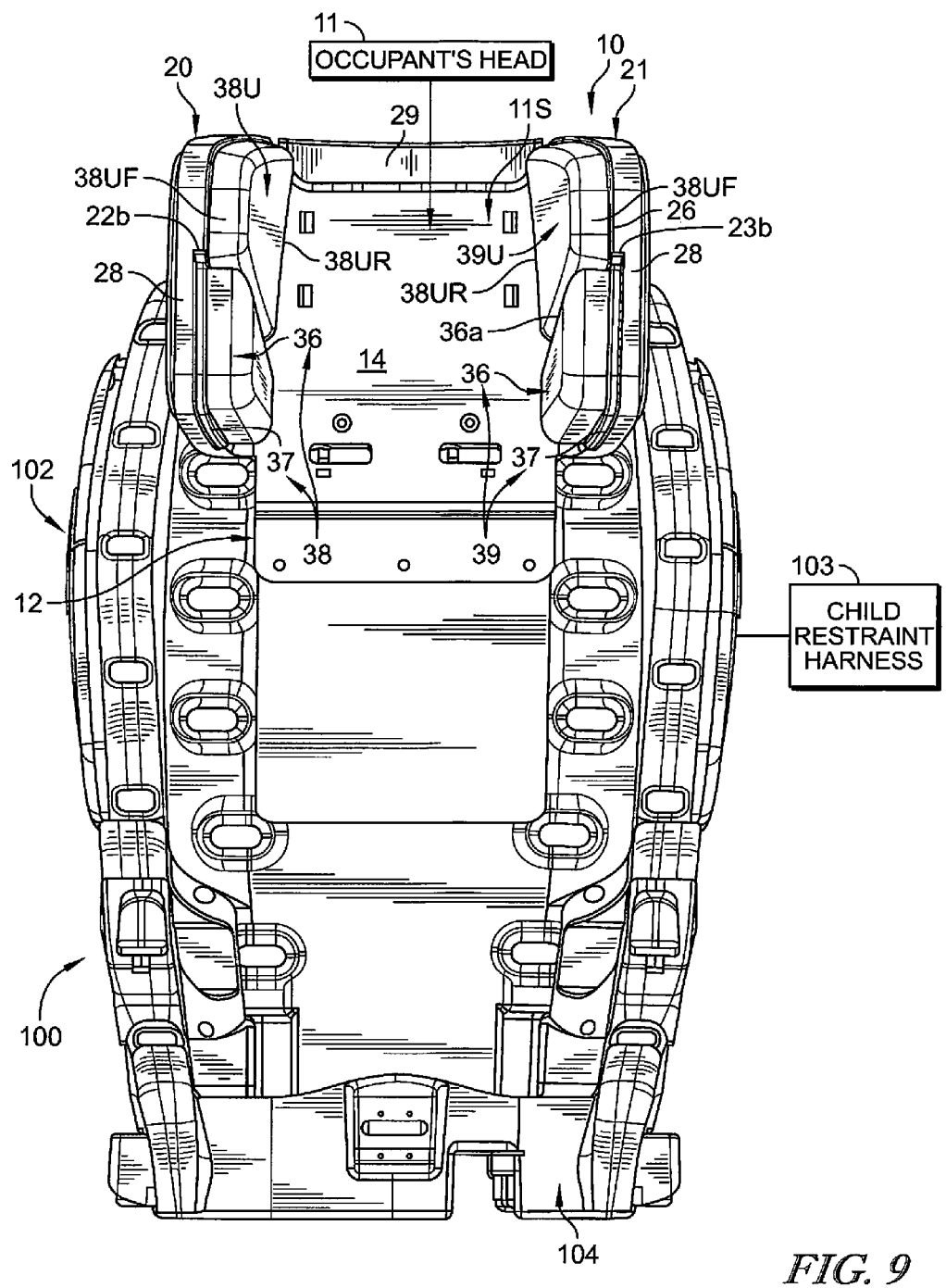
FIG. 9 is a front perspective view of an occupant restraint including a seat shell fitted with the headrest of FIGS. 1 to 4.

In illustrative embodiments, headrest 10 is sized and configured for use in a vehicular child restraint of the kind in which a child is seated generally upright as suggested in FIG. 9. In illustrative embodiments, a vehicular child restraint 100 comprises a seat shell or frame 101 coupled to headrest 10. In the illustrated embodiment, seat shell 101 comprises a seat base 102 and a seat back 103 extending upwardly from seat base 102 as suggested in FIG. 9.

Figure 4:
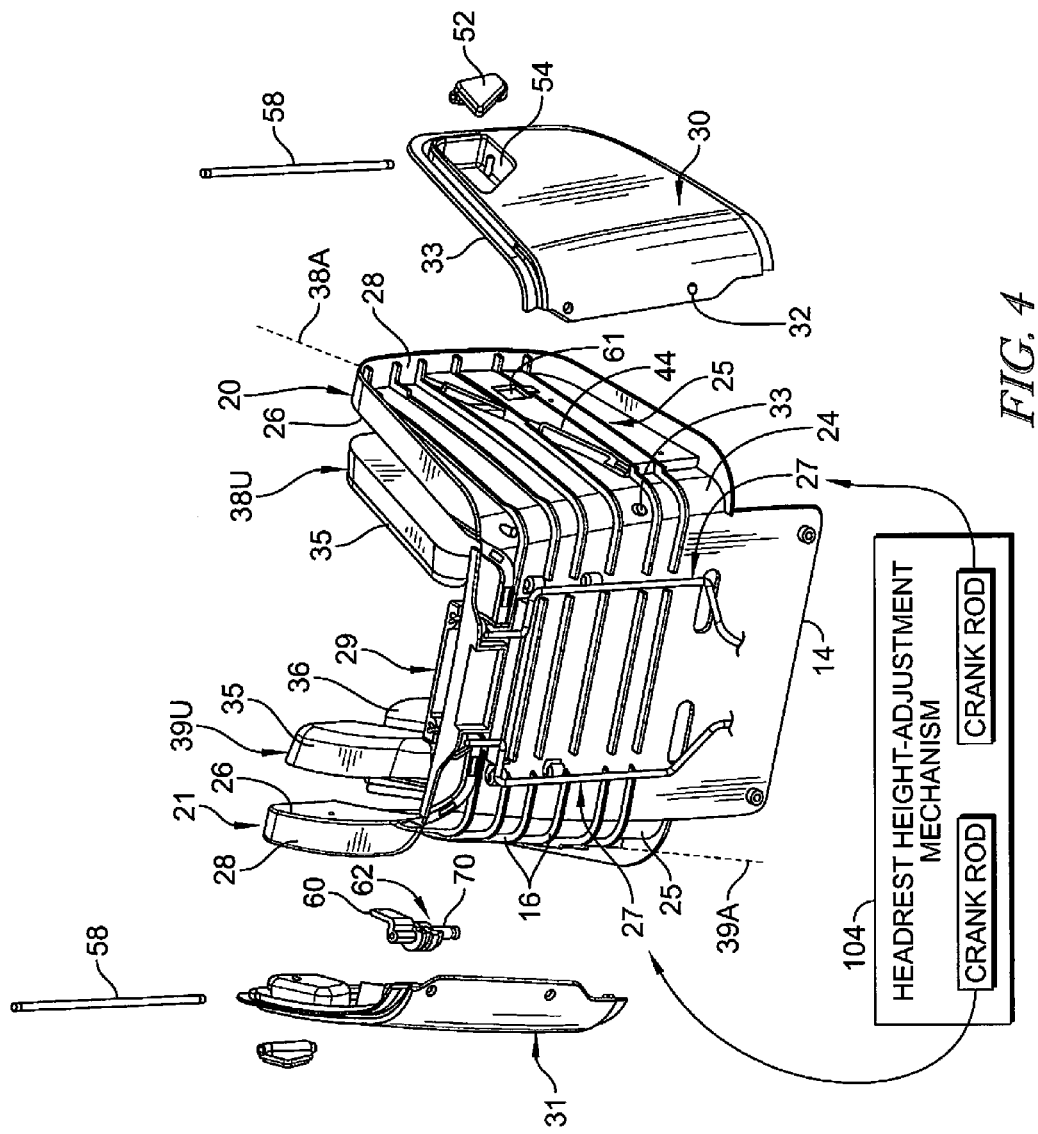
FIG. 4 is an exploded rear perspective view corresponding to FIG. 3 and shows components that are included in a headrest height-adjustment mechanism that is associated with the headrest.

The general structure and configuration of the illustrated headrest 10 is best appreciated from FIGS. 1, 3, and 4 of the appended drawings. The headrest 10 includes a body 12 in the form of a molded shell of a suitably hard and strong plastics material. Either the body 12 of the headrest 10 is integral with the seat shell or frame 101 or headrest 10 is mounted to the seat shell or frame 101. In the latter case, headrest 10 may be vertically adjustable relative to seat shell or frame 101 using, for example, a headrest height-adjustment mechanism 104 in accordance with the present disclosure to accommodate children of different heights, or to accommodate a child as the child grows. A child-restraint harness 105 may be coupled to seat shell 101 as suggested diagrammatically in FIG. 9.

Body 12 of headrest 10 includes a back plate 14 that extends generally vertically in situ and a pair of side wings 20, 21 that comprise side-wing panels 20P, 21P that project integrally from upright side edges of back plate 14 as shown in FIGS. 1 to 4. Side-wing panels 20P, 21P are spaced apart from one another to accommodate a child's head 11 between generally opposed inside faces 22, 23 of the side wings 20, 21 as suggested in FIG. 1. The side-wing panels 20P, 21P merge into the back plate 14 at curved corner regions 24A, 24B as suggested in FIG. 4. Rigidity of body 12 is provided in part by multiple spaced shallow ribs 16 that are included in the body 12 and extend around and are coupled to the outside of both back plate 14 and side-wing panels 20P, 21P as also suggested in FIG. 4.

Side wings 20, 21 are not parallel but flare outwardly at a shallow angle, in this case about 20°, in an illustrative embodiment as suggested in FIG. 4. This angle may vary within the scope of the present disclosure in illustrative embodiments of the present disclosure. Each side-wing panel 20P, 21P is bounded by a continuous edge 26 that extends in a partial curve along the top, front, and bottom sides. Edge 26 carries an outside flange 28 that lies substantially normal to inside face 22, 23 and defines within it a chamber 25 that is closed on the outside of the companion side wing by a respective suitably shaped and rimmed cover 30, 31. Each cover 30, 31 is a molded piece profiled with a peripheral lip 33 that snugly fits to a companion flange 28. Each cover 30, 31 is secured in place at the rear by screws (not shown) that engage respective holes 32 formed in the cover 31 or 32 to threaded integral sockets 33 formed in molded body 12 as suggested in FIG. 4.

A portion of a vehicle child restraint in the form of an upright seat 100 with a built-in child-restraint harness 105 and in which a headrest 10 is adjustably mounted to a seat back 103 of the seat 100 is depicted in FIG. 9. Such a vertical adjustment of the headrest 10 allows children of different heights to be accommodated properly in the seat 100 with the headrest 10 at the correct height relative to a seat bottom 102 also included in seat 100, or allows a seat 100 used by a particular child to be adjusted as the child grows. A headrest height-adjustment mechanism 104 is provided on the back of the headrest 10. Headrest height-adjustment mechanism 104 is suggested diagrammatically in FIG. 4 and includes a pair of vertically aligned rotatable crank rods 27 that are rotated by depressing an elongate button 29 included in headrest height-adjustment mechanism 104 and provided at the top of back plate 14. Depression of this button 29 rotates crank rods 27 to release locking devices (not shown) included in headrest height-adjustment mechanism 104 and so allow the headrest 10 to be moved up or down, on seat back 103 typically to indexed positions matching a plurality of possible positions of the child-restraint harness 105.

The inside faces 22, 23 of side-wing panels 20P, 21P each mount a pair of pads as suggested in FIG. 3. The inside face 22 of first side-wing panel 20P carries a stationary or fixed upper pad 38U and an underlying adjustable chin-support pad 38 as suggested in FIGS. 1 to 3. The inside face 23 of second side-wing panel 21P carries a stationary or fixed upper pad 39U and an underlying adjustable chin-support pad 38 as suggested in FIGS. 1 to 3.

Each stationary upper pad 38U, 39U comprises a cushion 35 while each adjustable chin-support pad 38, 39, comprises a cushion 36 as suggested in FIGS. 1 to 3. Cushions 35 of the stationary upper pads 38U, 39U are vertically longer at the rear (near back plate 14) than at the front (away from back plate 14) while cushions 36 of the adjustable chin support pads 38, 39 are the converse, vertically longer at the front than at the rear as suggested in FIGS. 1 to 3. They are thus complementary and spaced apart between parallel opposed edge faces 35a, 36a that are inclined rearwardly and downwardly at about 20° to 30°. Fixed cushions 35 are positioned proud (i.e. slightly projecting from a surface) of side wing faces 22, 23 by suitable companion internal frames (not shown) fixed to back plate 14.

Each cushion 36 of chin-support pad 38 or 39 is fixed to a companion cushion base 37 as suggested in FIGS. 1 to 4 in an illustrative embodiment. Each cushion base 37 in turn sits substantially flush in a complementary shallow recessed portion 22a, 23a of inside face 22, 23 defined by an inclined shoulder 22b, 23b that extends parallel to the edge faces 35a, 36a of cushions 35, 36. A pair of projections 40 are located through respective slots formed in shoulder 22b, 23b and retained in position while free to rotate by respective cleats 44 on the insideface of the adjacent cover 30, 31. Each projection 40 comprises a cylindrical rod portion 41 and an intervening connecting web 42. The outer edge of these cleats 44 has a concave profile to match and seat the rod portions 41.

In this manner, each chin-support pad 38 or 39 is able to rotate on the companion inclined axis 38A or 39A of rod portions 41 between a fully RETRACTED position adjacent its companion wing 20, 21 and a number of EXTENDED AND INCLINED positions at varying rotational positions outwardly of the companion side wing, up to, for example, 45° relative to the fully RETRACTED position. One of these EXTENDED AND INCLINED positions is illustrated in FIG. 2. In one or more of the EXTENDED AND INCLINED positions, the chin-support pad 38 or 39 is arranged to provide a chin and/or jaw support for the head of a child when accommodated between side wings 20, 21 of headrest 10.

Respective pad movers 38M, 39M are provided at side wings 20, 21 for moving the chin-support pads 38, 39 from their RETRACTED positions to their EXTENDED AND INCLINED positions at the option of a caregiver. In illustrative embodiments, each pad mover 38M, 39M includes a hand-operable lever actuator 52 separate from the associated pad 38, 39 and an indexing mechanism 62 that defines a number of selectable discrete EXTENDED AND INCLINED positions of the chin-support pads 38, 39 at which a sufficient predetermined force on cushion 36 of each pad 38, 39 will be effective to move such pad 38 or 39 back to the RETRACTED condition without damaging the pad mover 38 or 39 or the companion indexing mechanism 62.

Figure 5:
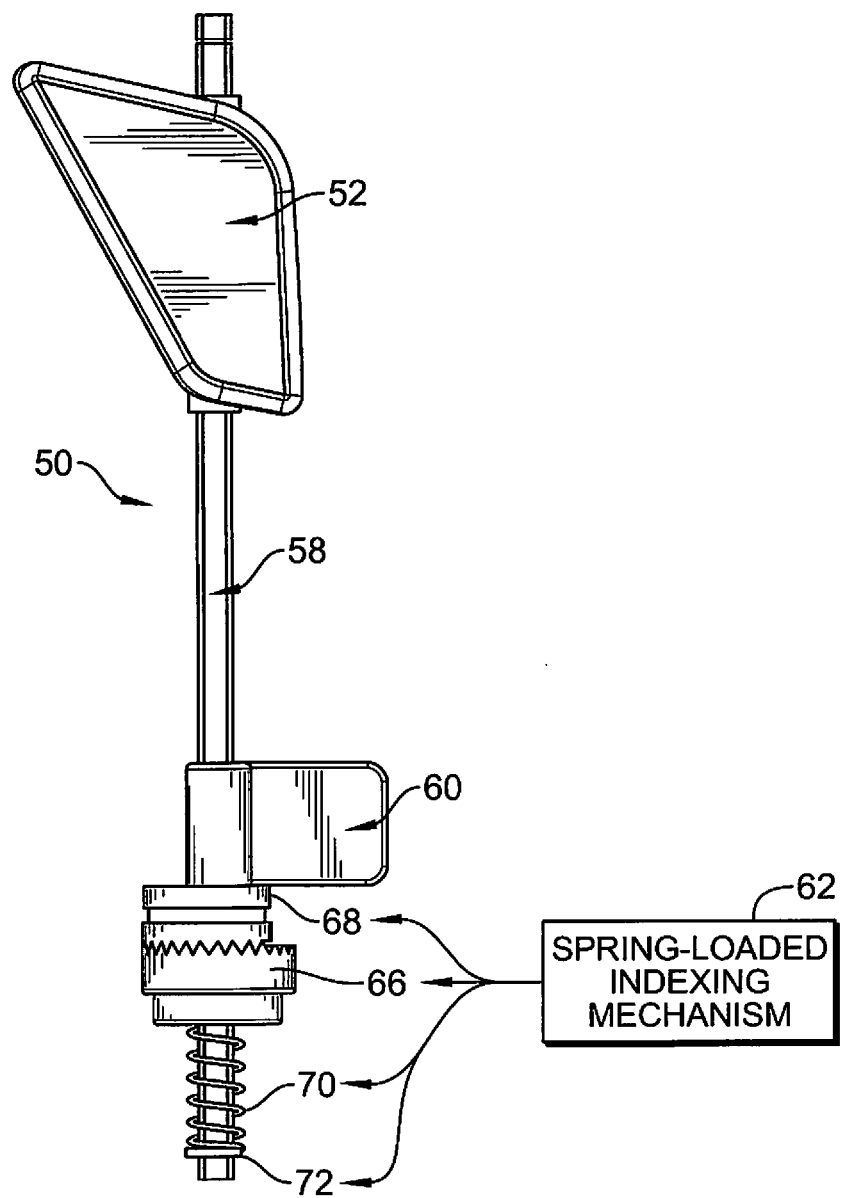
FIG. 5 is a fragmentary view of one of the pad movers that is operable to move a companion chin-support pad from its RETRACTED position to its EXTENDED AND INCLINED position.
Figure 6:
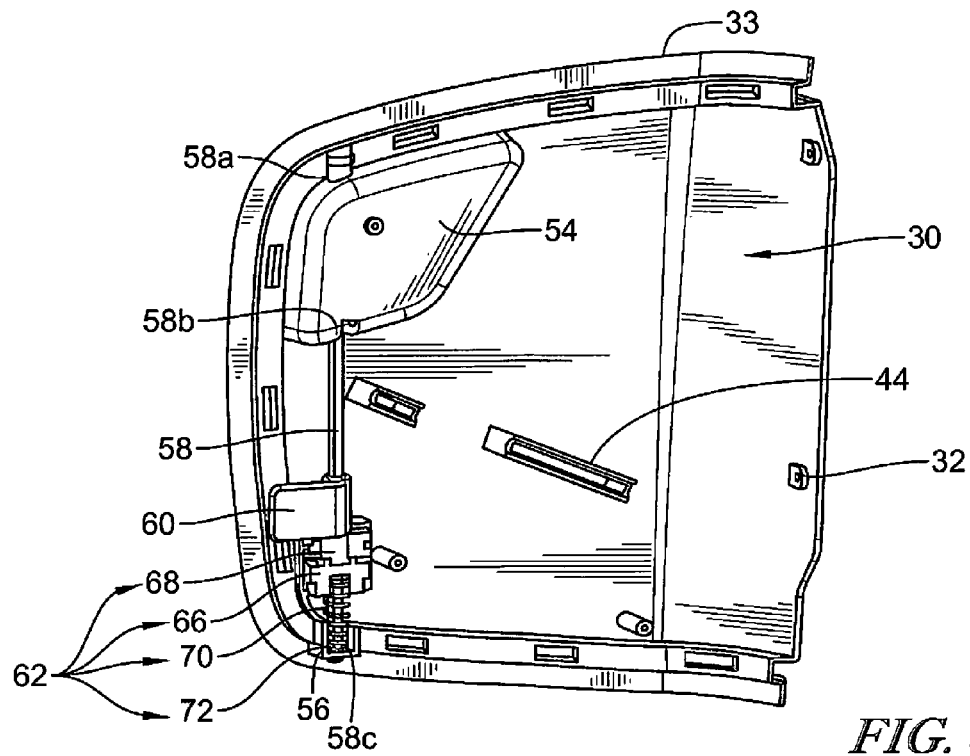
FIGS. 6-8 are fragmentary views of the pad mover mounted in situ on its cover, viewed from inside the cover and shown in successive operative positions.
Figure 7:
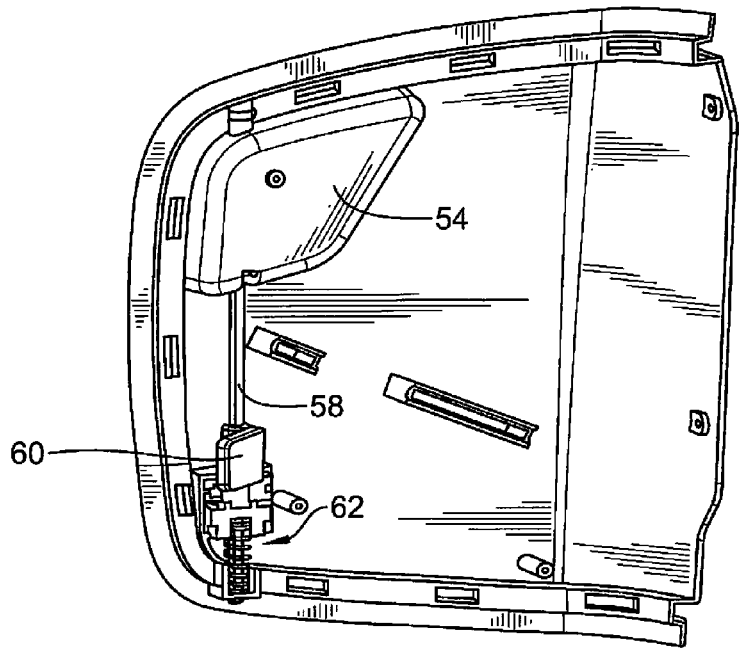
Figure 8:
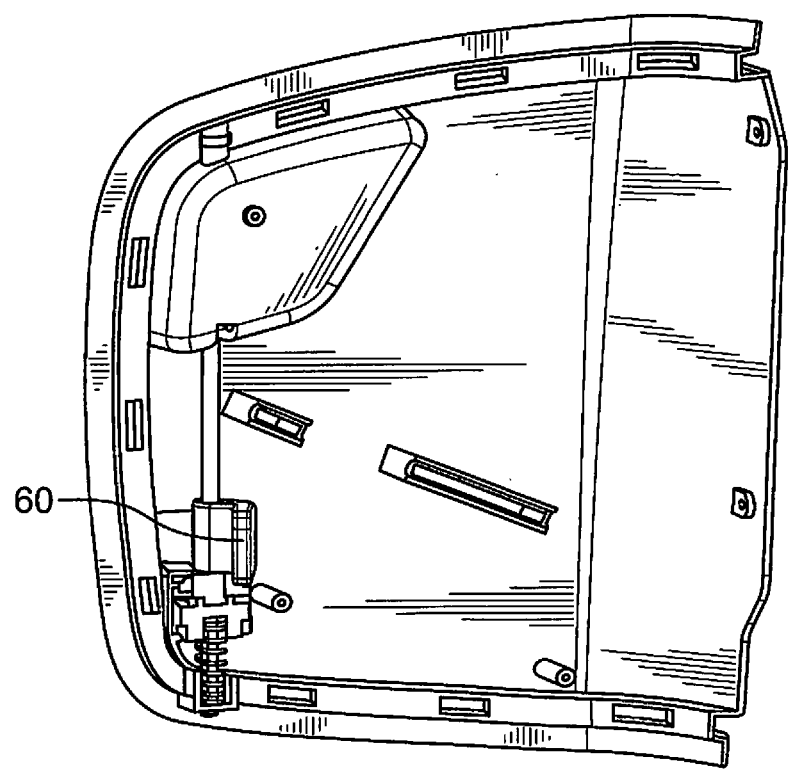

Pad mover 38M is best seen in situ in FIGS. 6 to 8, while its separate components are shown apart in the exploded views of FIGS. 3 and 4. The assembled pad mover 38M is shown in isolation in a separate drawing in FIG. 5. Each pad mover 38M, 39M is mounted on a companion cover 30, 31, which is provided with two mounting features, i.e. an enclosed well 54 in the outer face of the cover 30, 31 adjacent to the outer top corner of the cover 30, 31, and an integral bracket 56 on the inside face 22, 23 at the outer bottom corner. Each pad mover 38M, 39M includes a D-section or other keyed shaft 58 that extends vertically through respective apertures 58a, 58b in the peripheral wall of well 54 and an aperture 58c in the base wall of bracket 56.

Shaft 58 is locked against translational movement and irrotationally carries lever actuator 52 shaped to fit into well 54 so that it can be gripped easily by a hand and pulled outwardly to rotate the shaft 58. This action in turn rotates an L-shaped paddle 60 that projects through an aperture 61 adjacent side wing 20, 21 to contact the rear of cushion base 37. Thus, when lever actuator 52 is pulled out, paddle 60 is rotated (FIG. 7) to push the cushion base 37, so that chin-support pad 38 or 39 rotates outwardly (FIG. 2) on the inclined axis 38A or 39A defined by its rod members 41. Successive positions of the pad mover 38M as the lever actuator 52 is pulled out are shown in FIGS. 6 to 8.

A spring-loaded indexing mechanism 62 is provided on shaft 58 below paddle 60. Indexing mechanism 62 comprises a detent disc 66, bracket 68, spring 70, and collar 72 as suggested in FIG. 5. A toothed detent disc 66 has an upper annular rim of V-section teeth complementary to V-section teeth on a bracket 68 secured to the inside wall of the cover 30, 31. The detent disc 66 is biased into engagement with the bracket teeth by a helical compression spring 70 carried by shaft 58 between a blind bore on disc 66 and a collar 72 on the shaft 58. As lever actuator 52 is rotated with sufficient force to overcome the spring force, detent disc 66 indexes along the teeth of bracket 68 so that each tooth engaged position defines an indexed position of chin-support cushion 36. Conversely, spring 70 is set so that the first chin-support pad 38 will not move to the RETRACTED position when a sleeping child's face is being supported by the first chin-support pad 38 but, if sufficient force is applied against the first chin-support pad 38, deliberately by hand or during an impact, detent disc 66 will index in reverse to allow the first chin-support pad 38 to move to the RETRACTED position as paddle 60 is pushed back and hand lever actuator 52 rotates back into its well 54.

A headrest 10 in accordance with the present disclosures advantageously addresses the problem of providing head support for a sleeping child seated in a child restraint. The respective chin-support pads 38, 39 are independently movable in an illustrative embodiment to a range of selective positions to support the chin and/or jaw of the child whose head is tending to droop forwardly and sideways while asleep. The tapered inclined shape of each chin-support pad 38, 39 helps to both support the head and incline it rearwardly. The pad movers 38M, 39M for extending the chin-support pads 38, 39 involves hand activation of a simple lever and the arrangement is such that at each indexed position the chin-support pad 38, 39 is returnable easily from its EXTENDED AND INCLINED position to its RETRACTED position by overcoming the spring force of the indexing mechanism 62. The inside faces 22, 23 of side wings 20, 21 each mount a pair of pad members.

An occupant restraint 100 is provided for a mobile vehicle (not shown). The restraint 100 includes a headrest 10, a first chin-support pad 38, and a second chin-support pad 39 as suggested in FIGS. 1 to 3 and 9.

Headrest 10 includes a first side wing 20, a second side wing 20 arranged to lie in spaced-apart relation to the first side wing 20, and a back plate 14. Back plate 14 is arranged to extend between the first and second side wings 20, 21 and cooperate with the first and second side wings 20, 21 to define a head-receiving space 11S therebetween as suggested in FIGS. 1 and 2.

A first chin-support pad 38 is mounted on the first side wing 20 for pivotable movement about a positively sloping inclined first pad pivot axis 28A toward the second side wing 21 from a RETRACTED position alongside the first side wing 20 to an EXTENDED AND INCLINED position away from the first side wing 20. In the EXTENDED AND INCLINED position, first chin-support pad 38 is oriented to provide support for a first side of a chin of an occupant of the occupant restraint 100.

A second chin-support pad 39 is mounted on the second side wing 21 for pivotable movement about a positively sloping inclined second pad pivot axis 39A toward the first side wing 20 from a RETRACTED position alongside the second side wing 21 to an EXTENDED AND INCLINED position away from the first side wing 20. In the EXTENDED AND INCLINED position, second chin-support pad 39 is oriented to provide support for an opposite second side of a chin of the occupant of the occupant restraint 100.

Occupant restraint 100 further includes a first pad mover 38M associated with the first side wing 20 and configured to move the first chin-support pad 38 about the positively sloping inclined first pad pivot axis 38A from the RETRACTED position shown in FIG. 1 to the EXTENDED AND INCLINED position shown in FIG. 2. Restraint 100 also includes a second pad mover 39 associated with the second side wing 21 and configured to move the second chin-support pad 39 about the positively sloping inclined second pad pivot axis 39A from the RETRACTED position shown in FIG. 1 to the EXTENDED AND INCLINED position (not shown). In Illustrative embodiments, the positively sloping inclined first and second pad pivot axes 38, 39A are non-parallel as suggested in FIGS. 1 and 3.

First pad mover 38M is configured to provide means for maintaining the first chin-support pad 38 in the EXTENDED AND INCLINED position until a pad-retraction force $F_1$ (see FIG. 2) in excess of a predetermined force is applied to the first chin-support pad 38 by a moving head 11 of an occupant of the occupant restraint 100 so that application of such a pad-retraction force $F_1$ causes the first chin-support pad 38 to pivot about the positively sloping inclined first pad pivot axis 38A toward the RETRACTED position. First pad mover 38M illustratively includes a hand-operable lever actuator 52, a shaft 58, an L-shaped paddle 60, and a spring-loaded indexing mechanism 62 as suggested in FIG. 3.

Second pad mover 39M is configured to provide means for maintaining the second chin-support pad 39 in the EXTENDED AND INCLINED position until a pad-retraction force $F_2$ (see FIG. 2) in excess of a predetermined force is applied to the second chin-support pad 39 by a moving head 11 of an occupant of the occupant restraint 100 so that application of such a pad-retraction force $F_2$ causes the second chin-support pad 39 to pivot about the positively sloping inclined second pad pivot axis 39A toward the RETRACTED position. Second pad mover 39M illustratively includes a hand-operable lever actuator 52, a shaft 58, an L-shaped paddle 60, and a spring-loaded indexing mechanism 62 suggested in FIG. 3.

First pad mover 38M is configured to provide means for establishing a series of different discrete angular intermediate positions of the first chin-support pad 38 during pivoting movement of the first chin-support pad 38 about the positively sloping inclined first pad pivot axis 38A from the RETRACTED position to the EXTENDED AND INCLINED position. Second pad mover 39M is configured to provide means for establishing a series of different discrete angular intermediate positions of the second chin-support pad 39 during pivoting movement of the second chin-support pad 39 about the positively sloping inclined second pad pivot axis 39A from the RETRACTED position to the EXTENDED AND INCLINED position.

Restraint 100 further includes a first upper pad 38U coupled to the first side-wing panel 20P and arranged to lie above and in spaced-apart relation to the underlying first chin-support pad 39 to locate the positively sloping first pad pivot axis 38A therebetween as suggested in FIG. 9. First chin-support pad 38 has a rear portion 38R located adjacent to the back plate 14 along a rearward proximal edge of the first side-wing panel 20P and a front portion 38F arranged to lie in spaced-apart relation to the back plate 14 along the forward distal edge of the first side-wing panel 20P. The front portion 38F has a vertical height that is greater than a vertical height of the rear portion 38R. First upper pad 38U has a rear portion 38UR located adjacent to the back plate 14 along the rearward proximal edge of the first side-wing panel 20P and a front portion 38UF arranged to lie in spaced-apart relation to the back plate 14 along the forward distal edge of the first side-wing panel 20P, as suggested in FIG. 9. The rear portion 38UR has a vertical height that is greater than a vertical height of the front portion 38UF.

Second chin-support pad 39R has a rear portion located adjacent to the back plate 14 along a rearward proximal edge of the second side wing 21 and a front portion 39F arranged to lie in spaced-apart relation to the back plate 14 along the forward distal edge of the second side-wing panel 21P as suggested in FIG. 9. The front portion 39F has a vertical height that is greater than a vertical height of the rear portion 39R. The second upper pad 39U has a rear portion 39UR located adjacent to the back plate 14 along the rearward proximal edge of the second side-wing panel 21P and a front portion 39UF arranged to lie in spaced-apart relation to the back plate 14 along the forward distal edge of the second side-wing panel 21P, as suggested in FIG. 9. The rear portion 39UR has a vertical height that is greater than a vertical height of the front portion 39UF.

The invention claimed is:

1. An occupant restraint for a mobile vehicle, the restraint comprising
   a headrest including a first side wing, a second side wing arranged to lie in spaced-apart relation to the first side wing, and a back plate arranged to extend between the first and second side wings and cooperate with the first and second side wings to define a head-receiving space therebetween, a first chin-support pad mounted on the first side wing for pivotable movement about a positively sloping inclined first pad pivot axis relative to the back plate, toward the second side wing from a retracted position alongside the first side wing to an extended and inclined position away from the first side wing to provide support for a first side of a chin of an occupant of the occupant restraint, and a second chin-support pad mounted on the second side wing for pivotable movement about a positively sloping inclined second pad pivot axis relative to the back plate, toward the first side wing from a retracted position alongside the second side wing to an extended and inclined position away from the second side wing to provide support for an opposite second side of a chin of the occupant of the occupant restraint.

2. The restraint of claim 1, further comprising a first pad mover associated with the first side wing and configured to move the first chin-support pad about the positively sloping inclined first pad pivot axis from the retracted position to the extended and inclined position and a second pad mover associated with the second side wing and configured to move the second chin-support pad about the positively sloping inclined second pad pivot axis from the retracted position to the extended and inclined position.

3. The restraint of claim 2, wherein the positively sloping inclined first and second pad pivot axes are non-parallel.

4. The restraint of claim 2, wherein the first pad mover is configured to provide means for maintaining the first chin-support pad in the extended and inclined position until a pad-retraction force in excess of a predetermined force is applied to the first chin-support pad by a moving head of an occupant of the occupant restraint so that application of such a pad-retraction force causes the first chin-support pad to pivot about the positively sloping inclined first pad pivot axis toward the retracted position.

5. The restraint of claim 4, wherein the second pad mover is configured to provide means for maintaining the second chin-support pad in the extended and inclined position until a pad-retraction force in excess of a predetermined force is applied to the second chin-support pad by a moving head of an occupant of the occupant restraint so that application of such a pad-retraction force causes the second chin-support pad to pivot about the positively sloping inclined second pad pivot axis toward the retracted position.

6. The restraint of claim 2, wherein the first pad mover is configured to provide means for establishing a series of different discrete angular intermediate positions of the first chin-support pad during pivoting movement of the first chin-support pad about the positively sloping inclined first pad pivot axis from the retracted position to the extended and inclined position.

7. The restraint of claim 6, wherein the second pad mover is configured to provide means for establishing a series of different discrete angular intermediate positions of the second chin-support pad during pivoting movement of the second chin-support pad about the positively sloping inclined second pad pivot axis from the retracted position to the extended and inclined position.

8. The restraint of claim 1, further comprising a first upper pad coupled to a portion of the first side wing and arranged to lie above and in spaced-apart relation to the underlying first chin-support pad to locate the positively sloping first pad pivot axis therebetween.

9. An occupant restraint for a mobile vehicle, the restraint comprising a headrest including a first side wing, a second side wing arranged to lie in spaced-apart relation to the first side wing, and a back plate arranged to extend between the first and second side wings and cooperate with the first and second side wings to define a head-receiving space therebetween, a first chin-support pad mounted on the first side wing for pivotable movement about a positively sloping inclined first pad pivot axis toward the second side wing from a retracted position alongside the first side wing to an extended and inclined position away from the first side wing to provide support for a first side of a chin of an occupant of the occupant restraint, and a second chin-support pad mounted on the second side wing for pivotable movement about a positively sloping inclined second pad pivot axis toward the first side wing from a retracted position alongside the second side wing to an extended and inclined position away from the first side wing to provide support for an opposite second side of a chin of the occupant of the occupant restraint, further comprising a first upper pad coupled to a portion of the first side wing and arranged to lie above and in spaced-apart relation to the underlying first chin-support pad to locate the positively sloping first pad pivot axis therebetween, wherein the first chin-support pad has a rear portion located adjacent to the back plate along a rearward proximal edge of the portion of the first side wing and a front portion arranged to lie in spaced-apart relation to the back plate along the forward distal edge of the first side wing and the front portion has a vertical height that is greater than a vertical height of the rear portion.

10. The restraint of claim 9, wherein the first upper pad has a rear portion located adjacent to the back plate along the rearward proximal edge of the portion of the first side wing and a front portion arranged to lie in spaced-apart relation to the back plate along the forward distal edge of the portion of the first side wing and the rear portion has a vertical height that is greater than a vertical height of the front portion.

11. The restraint of claim 9, wherein the second chin-support pad has a rear portion located adjacent to the back plate along a rearward proximal edge of a portion of the second side wing and a front portion arranged to lie in spaced-apart relation to the back plate along the forward distal edge of the portion of the second side wing and the front portion has a vertical height that is greater than a vertical height of the rear portion.

12. The restraint of claim 11, wherein the first upper pad has a rear portion located adjacent to the back plate along the rearward proximal edge of the portion of the first side wing and a front portion arranged to lie in spaced-apart relation to the back plate along the forward distal edge of the portion of the first side wing and the rear portion has a vertical height that is greater than a vertical height of the front portion and wherein the second upper pad has a rear portion located adjacent to the back plate along the rearward proximal edge of the portion of the second side wing and a front portion arranged to lie in spaced-apart relation to the back plate along the forward distal edge of the portion of the second side wing and the rear portion has a vertical height that is greater than a vertical height of the front portion.

13. A headrest comprising
a back plate, a pair of side wings that project from the back plate and are spaced apart to accommodate a person's head between generally opposed inside faces of the side wings, opposed chin-support pads mounted to the respective side wings for movement between a retracted position adjacent the side wing and an extended and inclined position in which they are positioned to provide a chin and/or jaw support for a person's head when accommodated between the side wings, and control means for moving chin-support pads at least from their retracted positions to their extended and inclined positions, wherein the control means includes separate pad movers operable to separately and individually move the respective chin-support pads at least from their respective retracted positions to their extended and inclined positions.

14. The headrest of claim 13, wherein each pad mover is configured to define a plurality of extended and inclined positions at different angular intermediate positions relative to the retracted position.

15. The headrest of claim 13, wherein each chin-support pad is mounted for pivotable movement between its retracted position and it's extended and inclined position about an axis adjacent an upper edge or face of the chin-support pad that is rearwardly and downwardly inclined when the headrest assembly is in its normal operative position.

16. A headrest comprising a back plate, a pair of side wings that project from the back plate and are spaced apart to accommodate a person's head between generally opposed inside faces of the side wings, opposed chin-support pads mounted to the respective side wings for movement between a retracted position adjacent the side wing and an extended and inclined position in which they are positioned to provide a chin and/or jaw support for a person's head when accommodated between the side wings, and control means for moving chin-support pads at least from their retracted positions to their extended and inclined positions, wherein each chin-support pad is mounted for pivotable movement between its retracted position and it's extended and inclined position about an axis adjacent an upper edge or face of the chin-support pad that is rearwardly and downwardly inclined when the headrest assembly is in its normal operative position, wherein one or both of said chin-support pads is of greater height at its front than at its rear.

17. The headrest of claim 1, wherein each chin-support pad includes a cushion defining a face that contacts the chin and/or jaw in the extended and inclined position.

18. The headrest of claim 17, wherein said plurality of different angular intermediate positions are defined by respective positions on an indexing arrangement included in the control means.

19. The headrest of claim 18, wherein each of the intermediate positions on the indexing arrangement is such that a predetermined force against the chin-support pad will cause movement of the chin-support pad back towards its retracted position.

* * * * *